United States Patent Office 3,537,011
Patented Oct. 27, 1970

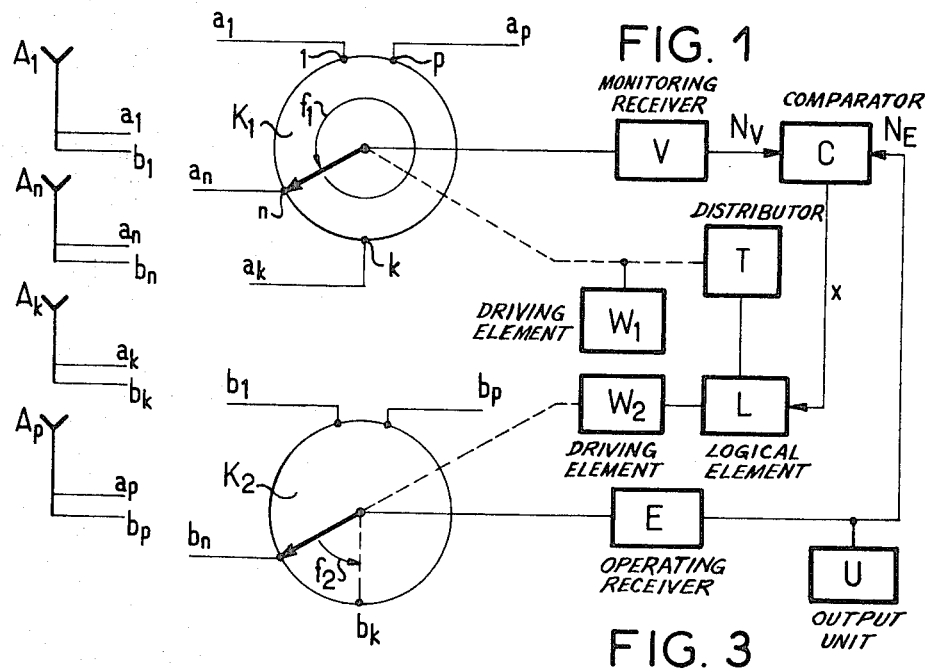
FIG. 1
FIG. 3
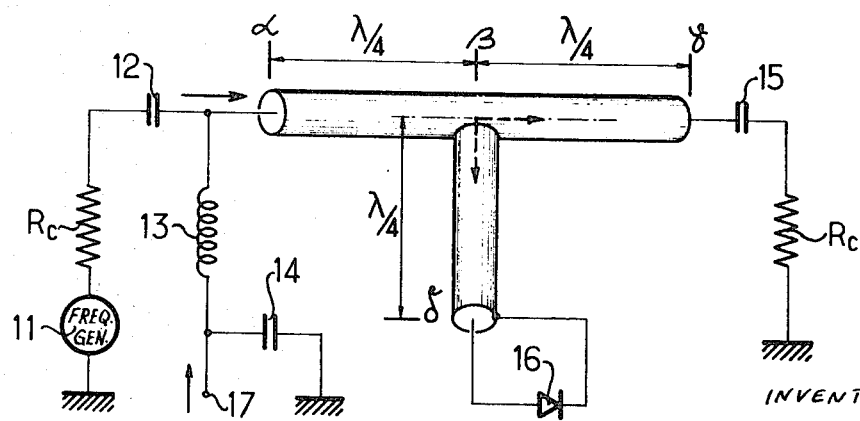
FIG. 4

3,537,011
ANTENNA SWITCHING ARRANGEMENT FOR CONTINUOUS SEQUENTIAL SAMPLING AND SELECTION OF BEST SIGNAL
Filed Nov. 22, 1967, Ser. No. 685,097
Claims priority, application France, Nov. 24, 1966, 84,907
Int. Cl. H04b 1/18
U.S. Cl. 325—304                                      6 Claims

ABSTRACT OF THE DISCLOSURE

Receiving system with several antennas, and two receivers, of which one is used for actual reception and the second for monitoring the reception level of each individual antenna, associated with a comparison device and a switching device, that switches over the first receiver on the antenna with the maximum level.

---

The present invention relates to a device for switching receiving antennas, thereby making it possible to select from an array comprising a large number of antennas that antenna which produces the strongest signal, to the exclusion of all other antennas.

The problem of obtaining a selection among several receiving antennas associated with a single reception channel is a very general one in the technology of wireless reception. Known methods for improving reception quality include operation with "diversified frequency," which entails transmitting simultaneously over several closely spaced frequencies to overcome the effects of selective fading; in other cases, the principle of "location diversity" is applied, which entails the operative association of several antennas located at different sites, one antenna of which, capable of random variation in time, receives a signal superior to all others on a single frequency.

More recently, there arose the problem of receiving signals coming from a point in space whose position is subject to constant or repeated variation. This is the case of a satellite transmitting the data recorded by its instrument package by radio waves, in particular meteorological satellites. Since a satellite of this kind may in principle occupy any given position in the sky in relation to the monitoring station at a given time, the latter, working in liaison with the satellite, must be equipped with a non-directional antenna. However, in order to obtain satisfactory gain from a non-directional antenna of this kind, it is ordinarily subdivided into a certain number $p$ of directional antennas, grouped in a polygonal structure having $p$ sides, where the principal lobe of each antenna measures, for example, $-3$ decibels in relation to the lobe axis and covers an azimuthal angle of $360°/m$ with $m<p$, so as to ensure an overlapping pattern between adjacent antennas.

The problem now considered is analogous to those previously discussed, in that it is concerned with "directional diversity."

The problem of selecting a given antenna from among $p$ associated antennas operating in diversity has already been solved. The known solutions consist for the most part of associating a receiver with each antenna, measuring the reception level at the output of the various receivers, comparing these levels and transmitting to the output unit (radiotelephonic reading, facsimile recorder, Teletype for radio telegraphy, etc.) only the strongest signal by means of an appropriate automatic switching system.

An arrangement of this kind may be considered as being fully satisfactory for a limited number of antennas of the order of 2 or 3. However, if the number of antennas is substantially greater, the installation becomes very expensive and bulky, and actually becomes less sensitive, a monitoring receiver being a relatively complex unit.

For this reason, in a receiving system comprising a plurality of switchable antennas, there are employed according to the invention only two receivers, an operating receiver connected to at least one output unit and an auxiliary monitoring receiver, the two receivers being connected to an antenna array having $p$ output terminals by means of switching elements provided with $p$ contact studs which, on the one hand, permanently change the connection between the input of said receiver for monitoring and said $p$ terminals according to a circular permutation and, on the other hand, modify the connection between the input of said operating receiver and one of the terminals $p$.

According to another feature of the invention, the device comprises means of comparison, adapted to measure the output level of said operating receiver and of the monitoring receiver and mounted in such a manner, as to emit an output signal when the first output level is lower than the second; a first switching unit with $p$ contact studs, each of which is connected to an output terminal of an antenna array; further means for rotating indefinitely by the runner of said switching element, which is fixedly connected to the input of the monitoring receiver; further a second switching unit with $p$ contact studs each of which is connected to an output terminal of the array, having a runner fixedly connected to the input of the operating receiver; and logical elements connected so as to receive the output signal of the aforesaid comparison means and capable of rotating the runner of the second switching element from a preceding position into a new position when the aforesaid output signal appears.

The invention will now be described with reference to the accompanying drawings, which illustrate the invention but in no restrictive sense.

FIG. 1 is a general schematic block diagram of an installation according to the invention;

Figure 2:
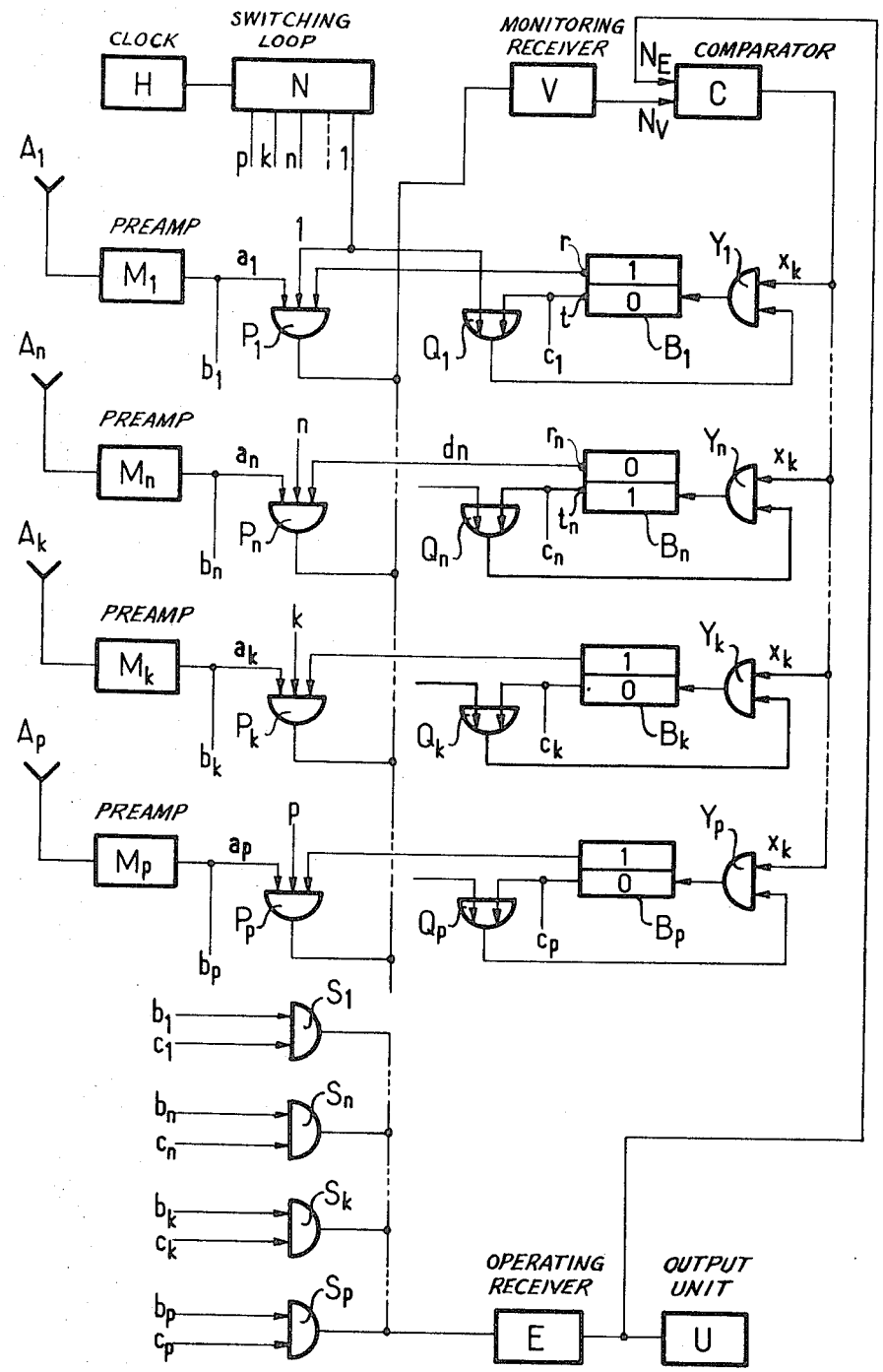
FIG. 2 is a schematic diagram of a preferred electronic form of the invention.

FIG. 3 is a table intended to facilitate the understanding of the mode of functioning of the invention, and FIG. 4 illustrates a preferred embodiment of the "AND" gates employed in the arrangement of FIG. 2 according to the invention. In FIG. 1, $p$ antennas A1 . . . A$n$ . . . A$k$ . . . A$p$, forming an array of the "diversity" type, are connected to the $p$ contact studs of a first switching element K1 by the lines $a$1 . . . $ap$, and to the $p$ contact studs of a second switching element K2 by the lines $b$1 . . . $bp$. The runner or movable contact of switching element K1, controlled as to position by a driving element W1, is electrically connected to the input of a monitoring receiver V, while the runner or movable contact of the second switching element K2, controlled by a driving element W2 for rapid movement, is connected electrically to the input of an operating receiver E, which can feed at least one output unit U.

The runner of switching element K1 rotates without interruption, as indicated by an arrow $f$1, thus connecting in circular permutation the various antennas to the input of receiver V. The output levels of the two receivers, respectively NV and NE, are connected to the input of a comparator C which is adapted to emit an output signal $x$ when detecting the condition $NV>NE$, the difference of which must exceed a suitable predetermined threshold value.

A logical element L which is connected to the output of comparator C so as to receive the signal $x$ is interconnected with a distributor T having $p$ contact studs, which distributor is driven by the element W1 and is positioned like the switching element K1. The logical element L is connected to the driving element W2. In the presence of a signal $x$ received on a position $k$ of the switching element K1, the switching element K2 rapidly connects the receiver E with the antenna A$k$, its runner passing from a previous position $n$ to the position $k$, as indicated by the arrow $f2$.

Thus, if the receiver E is not connected to the antenna bringing in the strongest signal, as determined in the comparator C by comparing the output of that antenna with the other antennas via the switch $K_1$, the switch $K_2$ is rotated to the antenna having the higher output, as detected by distributor T. In other words, with the switch $K_2$ resting on a given contact and thereby connecting a given antenna to the receiver E and the switch $K_1$ rotating continuously to sequentially connect the various antennas to the receiver V, a comparison of the level of the input from the antenna connected to receiver E can be compared to the input of all of the other antennas to the receiver V in comparator C. When the comparator detects an antenna providing stronger reception than the antenna already connected to receiver E, it generates signal $x$, which actuates the logic device L allowing the control signal from distributor T to be applied to driving element W2 in control thereof. The element W2 then drives switch K2 to connect the other antenna to the receiver E. Switch $K_1$ continues its rotation hunting constantly for a more efficient antenna.

In FIG. 2, an antenna array comprises $p$ antennas antennas A1 . . . A$n$ . . . A$k$ . . . A$p$, each provided with a preamplifier M1 . . . M$p$. The receiver arrangement comprises both unit elements and discrete elements in connection with each antenna. The discrete elements will be described with reference to Antenna A1.

The unit elements are: A switching loop N with $p$ contact studs, indexed $i1$ . . . $ip$, controlled by a clock H; a monitoring receiver V with an output level N$v$; an operating receiver E with an output level N$e$, capable of feeding at least one output unit U; a comparator C adapted to receive on two inputs the output levels N$e$ and N$v$, respectively. This comparator may be of any known type, for example a differential amplifier.

With reference to position 1, the discrete elements are provided in electronic form. An AND gate P1 with three inputs is provided, receiving over a line $a1$ the output signal of preamplifier M1, the output signal 1 of the loop, and an output signal $r1$ of a bistable flip-flop B1. An OR gate Q1 receives on two inputs the signal 1 of the loop and the output signal $t1$ of the aforesaid bistable flip-flop. An AND gate Y1 receives on two inputs the output signal of the aforementioned OR gate Q1 and eventually an output signal $x$ from the comparator C, the output of which can operate the aforesaid bistable flip-flop B1. A gate S1 is also provided having two inputs, one of which is connected to the output of the preamplifier M1 by a line $b1$, while the other is connected to the output $t$ of the bistable flip-flop B1 by a line $C_1$, and whose output is connected to the input of the operating receiver E.

FIG. 3 is a table showing the hypothetical value of the difference between the levels N$v$ and N$e$ at the input of comparator C in accordance with the diverse values of the index $i$. It is assumed that the bistable circuit B$n$ is in the position $rn=0$ $tn=1$. The 1 applied to the gate S$n$ by the line $cn$ opens this gate, and the signal of the antenna A$n$ is received by the monitoring receiver, to the exclusion of the signals of all other antennas. It is further assumed that, conditions having changed, the antenna A$k$ supplied a stronger signal than the antenna A$n$.

The difference D$k$ is therefore positive, while the differences of the other indices are negative, with the exception of difference D$n$ which is not formed, owing to the fact that the output $rn$ of the bistable circuit B$n$ transmits a 0 to the gate P$n$.

Under these conditions the operation is as follows:

At an instant of index $i$, different from $k$, of the scanning of the loop corresponding to the position $i$ of the electronic switching elements, the comparator C does not emit an output signal $x$.

At the instant $k$, there is a comparator output signal $xk$. This signal is applied to all the Y-gates. At the instant of index $k$, the scanning signal is transmitted by the gate Q$k$ to the AND-gate Y$k$, and the signal X$k$ is transmitted to the bistable circuit B$k$, which operates. At the same instant, the same signal $xk$ is applied to the input of the gate Y$n$. The OR gate Q$n$ receives from the terminal $tn$ of the bistable circuit B$n$ a 1, which it transmits to the input of the gate Y$n$. The result is that the signal $xk$ likewise switches the bistable circuit B$n$. Consequently, the operating receiver E is disconnected from the antenna A$n$ and connected to the antenna A$k$. This new situation prevails until another antenna supplies a signal stronger than the signal of antenna A$k$.

An AND-gate for use with high-frequency current may be advantageously constituted as indicated in FIG. 4, wherein a high-frequency generator 11, with an internal impedance R$c$, is connected via a capacitor 12 to a co-axial conductor whose length equals a half-length of a wave $\lambda/2$, with a characteristic impedance X$c$=R$c$, $\lambda$ corresponding to the frequency of the current supplied by the generator 11. This conductor $\alpha\gamma$ is closed, via a capacitor 15, by an impedance of value Z$c$, and is connected at its center $\beta$ to a quarter-wavelength line $\beta\delta$, whose extremity $\delta$ is connected to earth through a diode 16.

By a terminal 17, an operating D.C. voltage can be applied to the internal conductor at the point $\alpha$, uncoupled by a choke coil 13 and a capacitor 14.

When the diode 16 is polarized in the forward direction, its impedance is substantially zero, so that a quasi-infinite impedance appears from $\beta$ towards $\delta$. Consequently, from $\beta$ to $\alpha$ as well as from $\beta$ to $\gamma$ the apparent impedance is Z$c$=R$c$, and the current passes without appreciable losses.

If the diode 16 is polarized in reverse, a short-circuit is observed from $\beta$ to $\delta$, i.e. an infinite impedance from $\alpha$ to $\beta$; the energy does not flow towards the charge R$c$, and cut-off occurs.

The advantage over the similar gate systems known is that the locus of application of the D.C. drive is a point of low impedance, so that the effect of the unavoidable parasite impedances is greatly reduced. In this manner, a considerably more efficient cut-out effect can be obtained than when the direct current is applied directly to the diode 16.

I have shown and described two embodiments in accordance with the persent invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. An arrangement for switching receiving antennas in a complex array comprising a plurality of individual antennas, a first and a second receiver, first switch means for continuously connecting said antennas to said first receiver in successive order, second switch means controllable to selectively connect said second receiver to a given one of said antennas, and vontrol means responsive to the output of said first and second receivers for controlling said second switch means to connect said second receiver automatically to the antenna providing the highest signal level, said control means including a comparator connected to the outputs of said first and second receivers for generating a control signal in response to detection of a greater output from said first receiver than from said second receiver, said first switch means including a plurality of first gates individually connected to a respective antenna, and scanning means for sequentially triggering said first gates.

2. The combination defined in claim 1 wherein said second switching means includes a plurality of second gates individually connected to a respective antenna for connecting an antenna to said second receiver upon actuation by said control means.

3. The combination defined in claim 2 wherein said control means further includes means responsive to said scanning means and said control signal from said comparator for actuating only the second gate associated with the antenna connected to the first gate presently scanned by said scanning means 4. The combination defined in claim 2 wherein said control means further includes a plurality of bistable members equal in number to said antennas, an AND gate associated with each bistable member for applying the control signal from said comparator thereto, one output of each bistable member being connected to a respective first gate and the other output being connected to a respective second gate, and third gate means connecting said scanning means to said AND gates so as to actuate only the AND gate associated with first gate being scanned.

5. The combination defined in claim 4 wherein said third gate means includes a plurality of OR gates preventing application of a scanning signal to an associated AND gate connected to a bistable member in the "set" condition.

6. The combination defined in claim 2 wherein said first and second gates are provided as AND gates comprising a T network formed by three co-axial quarter-wavelength lines, the median branch of said network being short circuited by a diode, the long branch of said network of length $\lambda/2$ being connected at one end to a direct current supply.

References Cited
UNITED STATES PATENTS

| | | | |
|---|---|---|---|
| 2,937,268 | 5/1960 | Downie et al. | 325—370 X |
| 3,095,538 | 6/1963 | Silberstein | 325—370 X |
| 3,206,679 | 9/1965 | Miller | 325—302 |

RICHARD MURRAY, Primary Examiner

J. A. BRODSKY, Assistant Examiner

U.S. Cl. X.R.
325—302, 370, 372, 373; 343—100

UNITED STATES PATENT OFFICE
CERTIFICATE OF CORRECTION

Patent No. 3,537,011                    Dated  October 27, 1970

Inventor(s)  Henry ESCOULA

It is certified that error appears in the above-identified patent and that said Letters Patent are hereby corrected as shown below:

Title page, insert the following:

Henry Escoula, Lannion, France, assignor to
           Societe Lannionnaise D'Electronique,
    Lannion, France Signed and sealed this 7th day of January 1975.

(SEAL)
Attest:

McCOY M. GIBSON JR.
Attesting Officer

C. MARSHALL DANN
Commissioner of Patents